United States Patent
Pumyea et al.

(10) Patent No.: US 10,222,532 B2
(45) Date of Patent: Mar. 5, 2019

(54) LIGHT MIXING CHAMBER FOR USE WITH LIGHT GUIDE PLATE

(71) Applicant: SAMSUNG ELECTRONICS CO., LTD., Suwon-si (KR)

(72) Inventors: Warren Pumyea, Stoneham, MA (US); Sridhar Sadasivan, Concord, MA (US); Suchit Shah, San Jose, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 472 days.

(21) Appl. No.: 14/328,542

(22) Filed: Jul. 10, 2014

(65) Prior Publication Data

US 2015/0009686 A1    Jan. 8, 2015

Related U.S. Application Data

(63) Continuation of application No. PCT/US2013/021009, filed on Jan. 10, 2013.

(60) Provisional application No. 61/586,380, filed on Jan. 13, 2012.

(51) Int. Cl.
| | |
|---|---|
| *F21V 7/04* | (2006.01) |
| *F21V 8/00* | (2006.01) |
| *F21K 9/62* | (2016.01) |

(52) U.S. Cl.
CPC ............. *G02B 6/0031* (2013.01); *F21K 9/62* (2016.08); *G02B 6/003* (2013.01); *G02B 6/009* (2013.01); *G02B 6/0068* (2013.01); *G02B 6/0073* (2013.01); *G02B 6/0091* (2013.01); *G02B 6/0085* (2013.01)

(58) Field of Classification Search
CPC ....... F21K 9/54; G02B 6/00361; G02B 6/003; G02B 6/0068; G02B 6/0073; G02B 6/009; G02B 6/0091
USPC .......................................... 362/317, 341, 609
See application file for complete search history.

(56) References Cited

U.S. PATENT DOCUMENTS

| | | |
|---|---|---|
| 8,294,168 B2 | 10/2012 | Park et al. |
| 2001/0046131 A1 | 11/2001 | Hoelen et al. |
| 2006/0083281 A1 | 4/2006 | Inoguchi |
| 2007/0131954 A1 | 6/2007 | Murayama et al. |

(Continued)

FOREIGN PATENT DOCUMENTS

| | | |
|---|---|---|
| CN | 1383498 A | 12/2002 |
| CN | 1776908 A | 5/2006 |

(Continued)

OTHER PUBLICATIONS

CN2013800141060: 1$^{st}$ Office Action dated Mar. 2, 2016 in counterpart Chinese Patent Application No. 2013800141060.

(Continued)

*Primary Examiner* — Andrew Coughlin
*Assistant Examiner* — Meghan Ulanday
(74) *Attorney, Agent, or Firm* — Cantor Colburn LLP

(57) ABSTRACT

A light mixing chamber includes a housing having a channel formed therein, with the channel exposed to an exterior of the housing. A chamber is formed in the housing, and an aperture formed in the housing connects the chamber to the channel. The chamber may house an LED, with an optical member being retained within the channel. A light guide plate may be positioned on an exterior of the housing outside the channel.

15 Claims, 5 Drawing Sheets

(56) References Cited

U.S. PATENT DOCUMENTS

| | | |
|---|---|---|
| 2007/0165421 A1 | 7/2007 | Sakai et al. |
| 2008/0054281 A1 | 3/2008 | Narendran |
| 2008/0117500 A1 | 5/2008 | Narendran et al. |
| 2008/0237540 A1 | 10/2008 | Dubrow |
| 2010/0085750 A1 | 4/2010 | Van Ostrand et al. |
| 2010/0110728 A1 | 5/2010 | Dubrow et al. |
| 2010/0149783 A1 | 6/2010 | Takenaka et al. |
| 2010/0193806 A1 | 8/2010 | Byun |
| 2011/0141769 A1 | 6/2011 | Lee et al. |
| 2011/0292660 A1* | 12/2011 | Eichelberger ........ G02B 6/0006 362/311.02 |
| 2011/0309325 A1 | 12/2011 | Park et al. |
| 2012/0113671 A1 | 5/2012 | Sadasivan et al. |
| 2012/0155115 A1 | 6/2012 | Jang |
| 2013/0050612 A1 | 2/2013 | Hur |
| 2013/0100659 A1 | 3/2013 | Narendran |
| 2013/0114241 A1* | 5/2013 | van de Ven ........ H05B 33/0866 362/84 |
| 2013/0114301 A1 | 5/2013 | Um |
| 2013/0148376 A1 | 6/2013 | Nick et al. |
| 2013/0215136 A1 | 8/2013 | Jiao et al. |
| 2013/0271700 A1 | 10/2013 | Nakamura et al. |
| 2013/0271961 A1 | 10/2013 | Nakamura |
| 2013/0277643 A1 | 10/2013 | Williamson et al. |
| 2013/0294107 A1 | 11/2013 | Ohkawa et al. |
| 2013/0335677 A1 | 12/2013 | You |
| 2014/0035960 A1 | 2/2014 | You et al. |
| 2014/0036203 A1 | 2/2014 | Guillou et al. |
| 2014/0036536 A1 | 2/2014 | Gettemy et al. |
| 2014/0036538 A1 | 2/2014 | You et al. |
| 2014/0158982 A1 | 6/2014 | Park et al. |
| 2014/0240644 A1 | 8/2014 | Abe |
| 2015/0021521 A1 | 1/2015 | Nick et al. |
| 2015/0214445 A1 | 7/2015 | Qiu et al. |
| 2015/0338064 A1 | 11/2015 | Ishino |
| 2016/0091657 A1 | 3/2016 | Yang et al. |

FOREIGN PATENT DOCUMENTS

| | | |
|---|---|---|
| CN | 101004517 A | 7/2007 |
| CN | 201827848 U | 5/2011 |
| CN | 102209919 A | 10/2011 |
| JP | 3170074 U | 8/2011 |
| KR | 20030058106 | 7/2003 |
| KR | 100764455 B1 | 10/2007 |
| KR | 20110044002 A | 4/2011 |
| KR | 20110065053 A | 6/2011 |
| KR | 20110068109 A | 6/2011 |
| TW | I327667 B | 7/2010 |
| WO | WO2001084229 | 11/2001 |
| WO | WO2013078252 | 5/2013 |
| WO | WO2013106553 A1 | 7/2013 |

OTHER PUBLICATIONS

CN2013800141060: Search Report completed Feb. 22, 2016 in counterpart Chinese Patent Application No. 2013800141060. (English translation).

Intematix "Mixing Chamber Design Considerations for *ChromaLit™ Remote Phosphor Light Sources*" Applications Note (Jul. 7, 2011), pp. 1-10.

Mannan, O., "Creating White Light Utilizing Remote Phosphor Technology", Future Electronics, *FTM*, Oct. 2011, p. 26-27.

PCT/US2013/031009 Search Report and Written Opinion dated Apr. 29, 2013. PCT/US2013/031009 is the parent of the present application.

TW Application No. 102101225 office action dated Nov. 7, 2016 with English translation (6 pages).

\* cited by examiner

LIGHT MIXING CHAMBER FOR USE WITH LIGHT GUIDE PLATE

This application is a continuation of International Application No. PCT/US2013/021009, filed 10 Jan. 2013, which was published in the English language as International Publication No. WO 2013/106553 on 18 Jul. 2013, which International Application claims priority to U.S. Provisional Patent Application No. 61/586,380, filed on 13 Jan. 2012. Each of the foregoing is hereby incorporated herein by reference in its entirety for all purposes.

TECHNICAL FIELD OF THE INVENTION

Aspects of this invention relate generally to a light mixing chamber and, in particular, to light mixing chamber for use with a LED, an optical member, and a light guide plate of a backlight.

BACKGROUND OF THE INVENTION

Backlights are used for illumination in liquid crystal displays (LCDs) and may use a light emitting diode (LED) to produce its light. The light from an LED may pass into or be projected onto a light guide plate. During transmission from the LED to the light guide plate, the light rays may be diffused and reflected, reducing the effectiveness, output, and brightness of the device.

SUMMARY OF THE INVENTION

The principles of the invention may be used to provide a light mixing chamber for use with a light guide plate in a backlight using LEDs. In accordance with a first aspect, a light mixing chamber includes a housing having a channel formed therein, with the channel exposed to an exterior of the housing. A chamber is formed in the housing and an aperture formed in the housing connects the chamber to the channel. The chamber may house an LED, with an optical member being positioned or retained within the channel. A light guide plate may be positioned on an exterior of the housing outside the channel.

In accordance with another aspect, the light mixing chamber may include a plurality of chambers and apertures, with each aperture connecting a corresponding chamber to the channel. A flange may extend outwardly from the housing, adjacent the channel. A strip of material may be positioned on an inner surface of the flange facing the channel.

In accordance with other aspects, the channel may be formed of a base portion, a first wall and a second opposed wall, with the aperture being formed in the base portion. The first and second walls may be formed of a first portion and a second portion. The first portions may be tapered outwardly, and the second portion may be curved grooves. In accordance with some aspects, the first and second walls may include a third portion, which may be tapered outwardly.

In accordance with a further aspect, a light mixing chamber includes a housing having a channel formed therein, with the channel exposed to an exterior of the housing. An optical member is positioned in the channel. A chamber is formed in the housing, and an LED is positioned in the chamber. An aperture is formed in the housing and connects the chamber to the channel. A light guide plate is positioned adjacent the housing and adjacent the channel.

By providing a light mixing chamber with a light guide plate of a backlight using LEDs, light can be better collimated or otherwise directed such that the output, focus, and efficiency of the backlight can be improved. Further, hotspots and nonconformities within the light guide plate can be reduced. The light mixing chamber can also serve to dissipate heat. These and additional features and advantages disclosed here will be further understood from the following detailed disclosure of certain embodiments.

Figure 1:
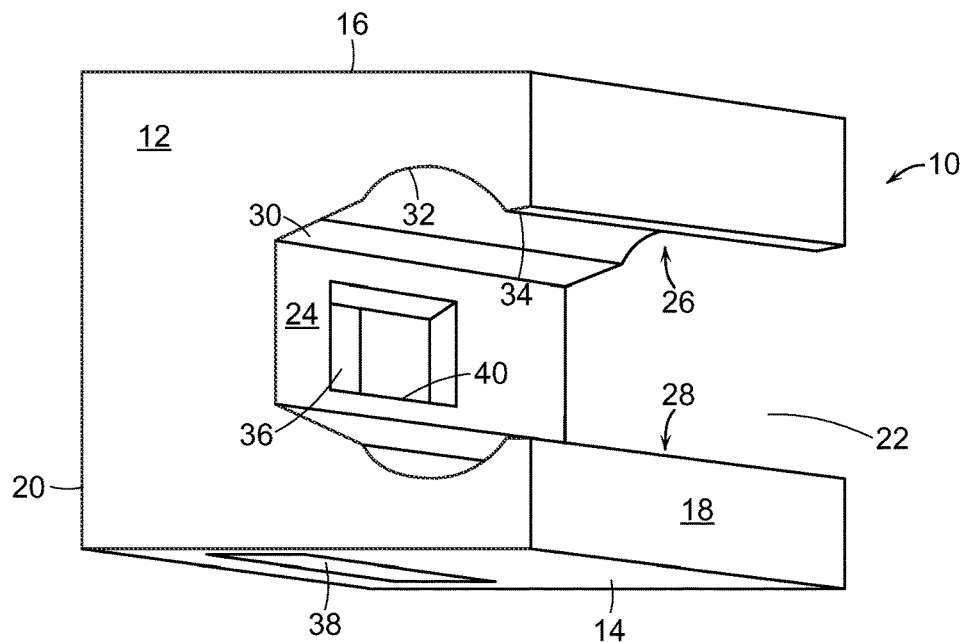
FIG. 1 is a perspective view of a light mixing chamber for use with a light guide plate in a backlight.

The figures referred to above are not drawn necessarily to scale, should be understood to provide a representation of particular embodiments of the invention, and are merely conceptual in nature and illustrative of the principles involved. Some features of the light mixing chamber depicted in the drawings have been enlarged or distorted relative to others to facilitate explanation and understanding. The same reference numbers are used in the drawings for similar or identical components and features shown in various alternative embodiments. Light mixing chambers as disclosed herein would have configurations and components determined, in part, by the intended application and environment in which they are used.

DETAILED DESCRIPTION OF CERTAIN PREFERRED EMBODIMENTS

Figure 2:
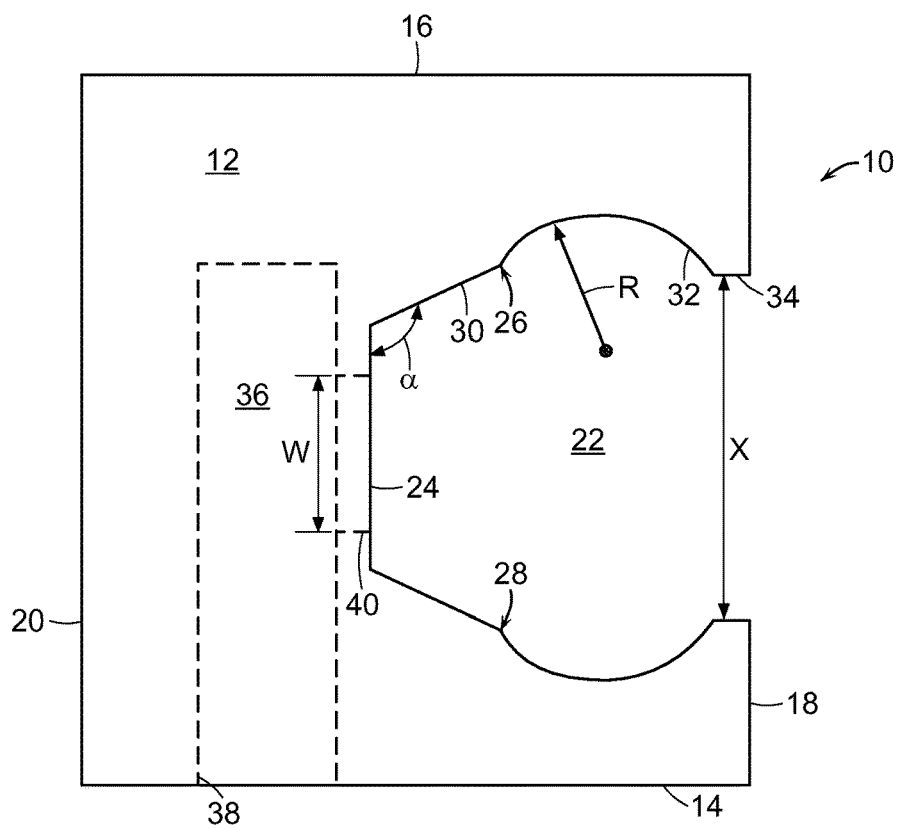
FIG. 2 is an elevation view of the light mixing chamber of FIG. 1.

The following discussion and accompanying figures disclose a light mixing chamber for use with a light guide plate in an LED backlight. An individual skilled in the relevant art will appreciate, given the benefit of this specification, that the concepts disclosed herein with regard to the light mixing chamber may apply to a wide variety of light applications, in addition to the specific embodiments discussed in the following material and depicted in the accompanying figures A light mixing chamber 10 for use with a light guide plate in a backlight is depicted in FIGS. 1 and 2 as including a housing 12 having a first side or surface 14 and an opposed second side or surface 16. In the illustrated embodiment, first surface 14 and second surface 16 are substantially planar surfaces and extend substantially parallel to one another. Both a third side or surface 18 and a fourth side or surface 20 extend between first and second surfaces 14, 16.

In the illustrated embodiment, third surface 18 and fourth surface 20 are substantially planar surfaces, extend substantially parallel to one another, and extend substantially perpendicular to first surface 14 and second surface 16.

A channel 22 is formed in third surface 18. In the illustrated embodiment, channel 22 is substantially U-shaped and includes a base portion 24, a first wall 26 and an opposed second wall 28. Base portion 24 may extend substantially parallel to third surface 18 and fourth surface 20, and substantially perpendicular to first surface 14 and second surface 16.

First wall 26 and second wall 28 may include a first portion 30, a second portion 32, and a third portion 34. Each first portion 30 is tapered outwardly such that channel 22 is wider where first portions 30 meet second portions 32 than where first portions 30 meet base portion 24. First portions 30 are tapered outwardly at an angle α greater than or equal to approximately 90° with respect to base portion 24.

In the illustrated embodiment, each second portion 32 is a curved groove formed in housing 12. Second portion 32 may have a radius R of between approximately 0.2 mm and approximately 3.0 mm. Each third portion 34 is a wall segment extending outwardly from an outermost end of second portion 32 to third surface 18. In the illustrated embodiment, each third portion 34 extends substantially perpendicular to third surface 18.

A chamber 36 is formed in housing 12. In the illustrated embodiment, chamber 36 is in communication with an exterior of housing 12 by way of a recess 38 formed in first surface 14. An aperture 40 is formed in base portion 24 of housing 12, and extends between and connects chamber 36 to channel 22. Aperture 40 has a width W that is narrower than at least a portion of a width X of channel 22. As seen in FIG. 2, the width X of channel 22 varies along its depth from first portion 30 through third portion 34.

In the illustrated embodiment, aperture 40 is rectangular in shape, but it is to be appreciated that aperture 40 can have any desired shape. For example, the internal corners of aperture 40 may be curved with any desired radius. Other suitable shapes for apertures 40 will become readily apparent to those skilled in the art, given the benefit of this disclosure. The size of aperture 40 is selected to accommodate LEDs of various sizes. In certain embodiments, the size is tailored for the particular LEDs to be used. The size of aperture 40 can also be selected to minimize the blockage of light emitted by the LED.

Figure 3:
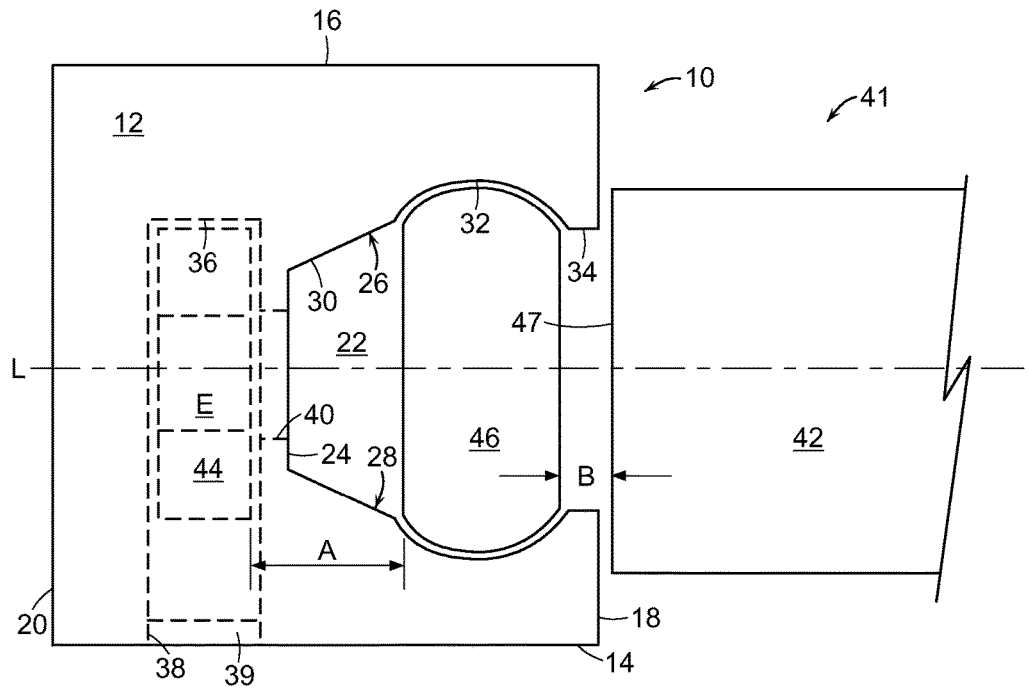
FIG. 3 is an elevation view of the light mixing chamber of FIG. 1, shown in use with an LED, an optical member, and a light guide plate in a backlight.

Light mixing chamber 10 is seen in FIG. 3 in use in a backlight 41 having a light guide plate 42. An LED 44 is inserted through recess 38 and is seated in chamber 36. It is to be appreciated that in certain embodiments, recess 38 may include a cover 39 so that chamber 36 is sealed from the exterior of housing 12. Cover 39 may be contained within recess 38, positioned on first surface 13 on the exterior of housing 12, or it may be a portion of another element outside of housing 12.

It is to be appreciated that light mixing chamber 10 can be used with a variety of LEDs including, but not limited to, surface mount, dome type, flat top side emitting diodes, and top face emitters. LEDs included in a backlight unit can be selected to emit light with a predetermined peak emission wavelength. For example, LEDs included in a backlight unit can be selected to emit light with a wavelength in the visible or ultraviolet regions of the electromagnetic spectrum. LEDs that emit polychromatic light can also be included. If more than one LED is included, each LED can be selected to emit light with a peak emission that is the same as that of the other LEDs. Alternatively, if more than one LED is included, the LEDs can be selected so that one or more of the LEDs emit light with a peak emission at a wavelength that is different from that emitted by at least one of the other LEDS. In certain embodiments, for example, all of the LEDs can be selected to emit light with a peak emission in the blue region of the visible spectrum or in the ultraviolet region of the spectrum. In certain other embodiments, a combination of red, blue, and/or green light-emitting LEDs can be included. In such case, the numbers of each of the different color light-emitting LEDs and relative placement thereof in the backlighting unit is selected based on the desired light output of combination of LEDs. Such numbers and relative placement can be determined by one of ordinary skill in the relevant art.

An optical member 46 is positioned between and captured by second portions 32 of first wall 26 and second wall 28. In certain embodiments, optical member 46 may be a glass member filled with semiconductor nanocrystals, or quantum dots. Examples of such optical members include, but are not limited to, those described in U.S. patent application Ser. No. 13/206,443 of Sridhar Sadasivan, et al., for "Quantum Dot Based Lighting," filed 9 Aug. 2011, U.S. Provisional Application No. 61/562,468 of Robert Nick, et al., for "Stress-Resistant Component For Use With Quantum Dots", filed 22 Nov. 2011, and International Patent Application No. PCT/US2012/066151 of QD Vision, Inc. for "Quantum Dot-Containing Compositions Including An Emission Stabilizer, Products Including Same, And Method", filed 20 Nov. 2012, each of the foregoing being herein incorporated by reference in its entirety. By fashioning second portions 32 as curved grooves, an optical member 46 having curved surfaces on opposed sides thereof can be secured in a robust manner within housing 12. It is to be appreciated that second portions 32 can have other geometries to mate with the geometry of optical members 46 having surfaces with shapes different than the curved surfaces seen in this exemplary embodiment.

Light projected from LED 44 passes through aperture 40 and between first portions 30 of chamber 22, through optical member 46, between third portions 44 of chamber 22, and into a side edge 47 of light guide plate 42. The geometry of tapered first portions 30 helps to collimate or otherwise direct the light toward optical member 46 and onward to light guide plate 42, typically to an edge surface thereof, and reduces the occurrence of light rays bouncing off first portions 30.

It is to be appreciated that light mixing chamber 10 can be implemented with light guide plate 42 in any backlight configuration including, for example, 2V, 2H, 1V, and 1H.

In certain embodiments, chamber 36, aperture 40 and channel 22 of housing 12 are configured such that distance A between LED 44 and optical member 46 is between approximately 0.3 mm and approximately 0.75 mm, and distance B between LED 44 and side edge 47 of light guide plate 42 is less than or equal to approximately 0.6 mm. The distances A and B can be varied in order to optimize the performance of the light mixing chamber 10 in use with the components housed therein. Further, the configuration of housing 12 accommodates the expansion and contraction of the components housed within housing 12, which may have different Coefficients of Thermal Expansion (CTE's).

In certain embodiments, housing 12 and aperture 40 are configured and sized so as to keep areas of LED 44 beyond its emitting area E positioned behind housing 12 so as to prevent reflection of light from these areas, thereby allowing only the light transmitted from emitting area E to project through aperture 40.

Additionally, chamber 36, aperture 40 and channel 22 of housing 12 are configured such that a center line L of each of light guide plate 42 and optical member 46 are coaxial with the center of emission area E of LED 44.

Base portion 24 provides a reflective surface to redirect and recycle back-scattered light, thereby increasing the output and efficiency of backlight 41. It is to be appreciated that the material used to form housing 12 may have a high reflectance across visible wavelengths. In certain embodiments, the material used to form housing 12 has a reflectance of between approximately 82% and approximately 99% across all visible wavelengths (e.g., across a range from approximately 380 nm to approximately 700 nm).

Housing 12 preferably serves to dissipate heat produced by LED 44 and optical member 46. Housing 12 may be electrically insulating, thermally conductive, and may be formed of a material able to withstand temperatures equal to or greater than 100° C. without any significant degradation of reflective properties across visible wavelengths or mechanical and structural integrity. Housing 12 may be coated with a white reflective paint or other coatings such as Star-Brite White EF (available from SPRAYLAT Sign Coatings), thermal sprays that include ceramic(s), polymer sprays that include Teflon PTFE, etc.

Housing 12 may be formed of metal, such as aluminum, tin, zinc, magnesium, or an alloy including at least one of the foregoing. Housing 12 can also be formed of other materials such as Makrolon® by Bayer, Lexan® by GE, OP.DI.MA. by Gigahertz-Optik, polyethylene terephthalate (PET), micro cell polyethylene terephthalate (MCPET), GORE® Diffuse Reflector Product, and Delrin® and Teflon by Dupont, for example. Other suitable materials for housing 12 will become readily apparent to those skilled in the art, given the benefit of this disclosure.

Housing 12 may be formed by machining, stamping, extrusion, molding, or casting, for example. Other suitable ways of forming housing 12 will become readily apparent to those skilled in the art, given the benefit of this disclosure.

Figure 4:
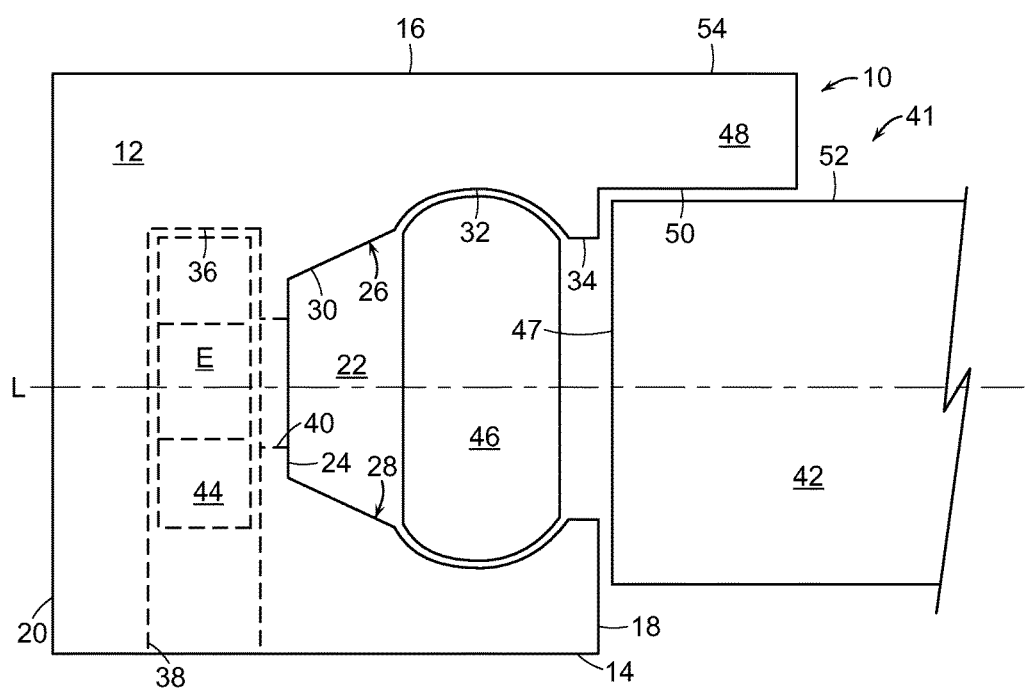
FIG. 4 is an elevation view of another alternative embodiment of the light mixing chamber of FIG. 1, shown in use with an LED, an optical member, a light guide plate in a backlight.

In certain embodiments, as seen in FIG. 4, a wall segment, shoulder, or flange 48 extends outwardly from third surface 18 proximate second surface 16. An inner surface 50 of flange 48 extends along a portion of a top or projection surface 52 of light guide plate 42, where projection surface 52 is the surface of light guide plate 42 that faces a user. Flange 48 serves to reduce hotspots within light guide plate 42, thereby improving the performance of backlight 41. In the illustrated embodiment, an outer surface 54 of flange 48 opposite inner surface 50 is flush with second surface 16. However, it is to be appreciated that outer surface 54 need not be flush with second surface 16 in other embodiments, and could extend beyond second surface 16 or be set back from second surface 16.

Figure 5:
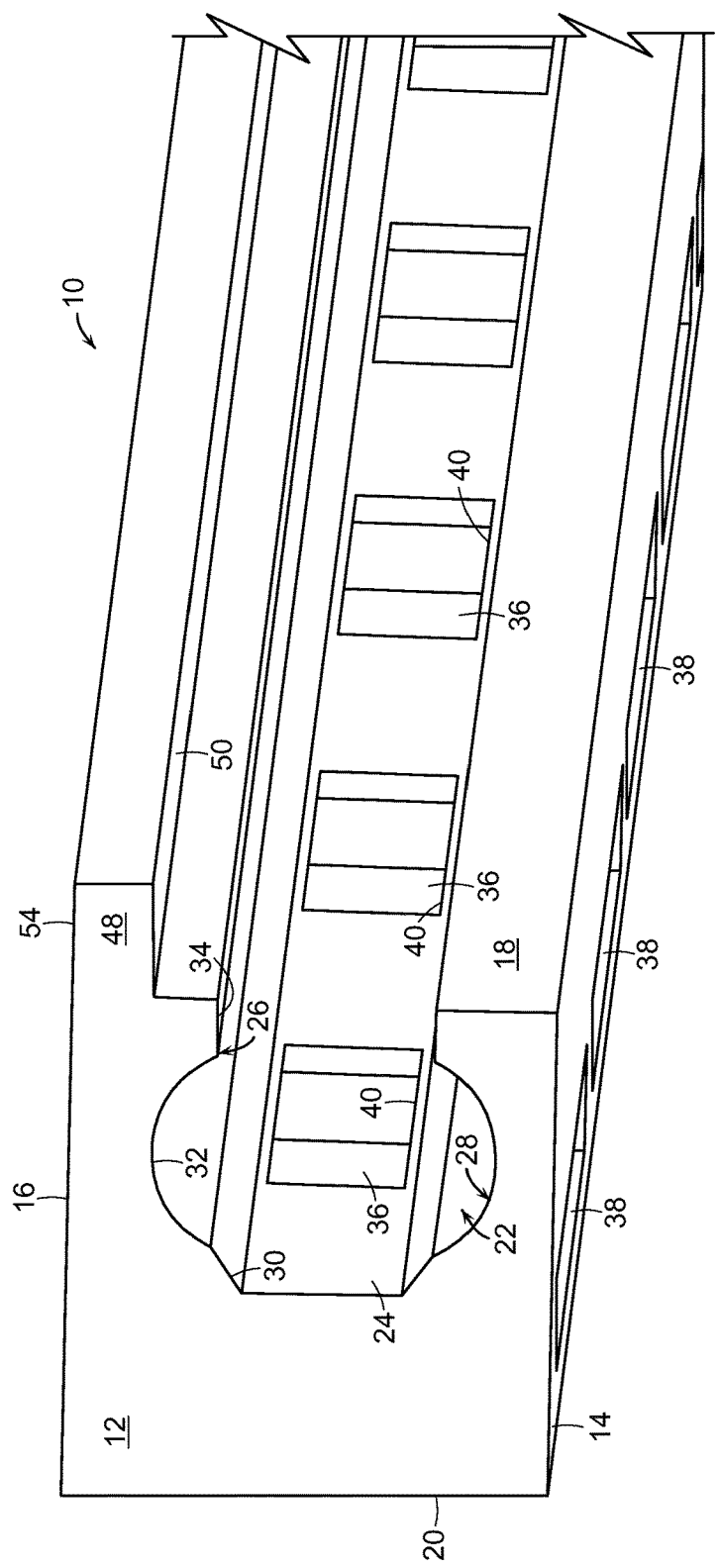
FIG. 5 is a perspective view of an alternative embodiment of the light mixing chamber of FIG. 1, which includes a plurality of chambers for housing a plurality of LEDs.

In certain embodiments, as illustrated in FIG. 5, light mixing chamber 10 includes a plurality of chambers 36 and mating recesses 38 and apertures 40, allowing a plurality of LEDs 44 to be seated in the chambers 36. Accordingly, light guide plate 42 and optical member 46 extend along the length of light mixing chamber 10 in order to receive the light transmitted from the plurality of LEDs 44.

Figure 6:
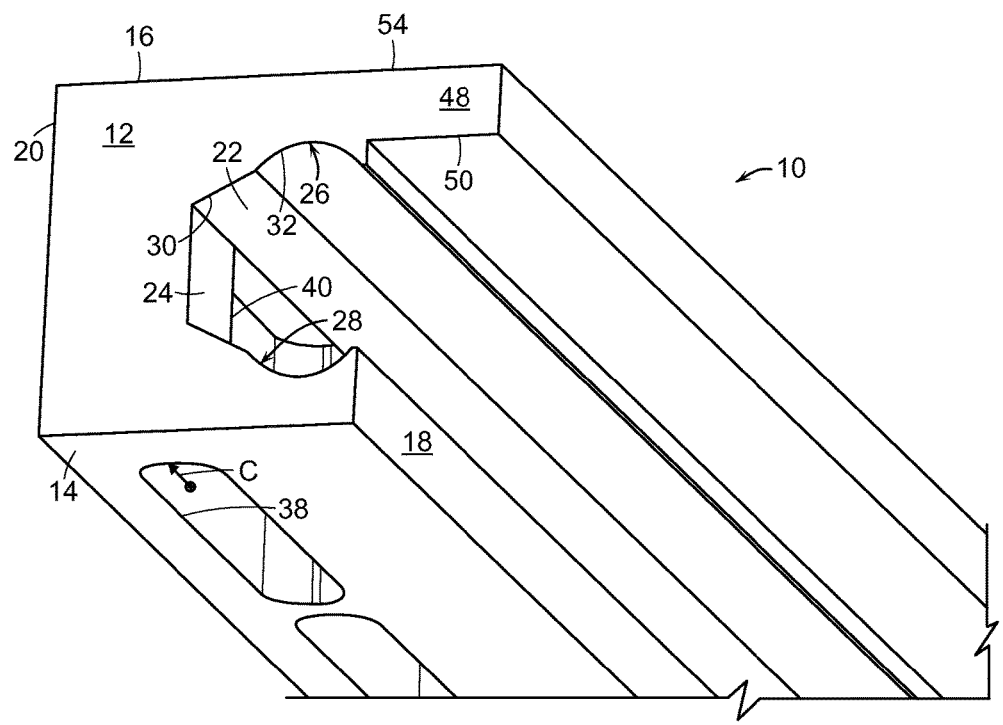
FIG. 6 is a bottom perspective view of the light mixing chamber of FIG. 5.

As seen in FIG. 6, in certain embodiments, recesses 38 formed in first surface 14 may be longitudinal recesses, with their internal corners having a radius C, thereby providing recesses 38 with a racetrack shape. In such an embodiment, the internal corners of chamber 36 may also have a radius. It is to be appreciated that recesses 38 and chambers 36 may have any desired shape, for example, they may be circular in cross-section, to mate with the shape of corresponding LEDs 44 seated in recesses 38 and chambers 36.

Figure 7:
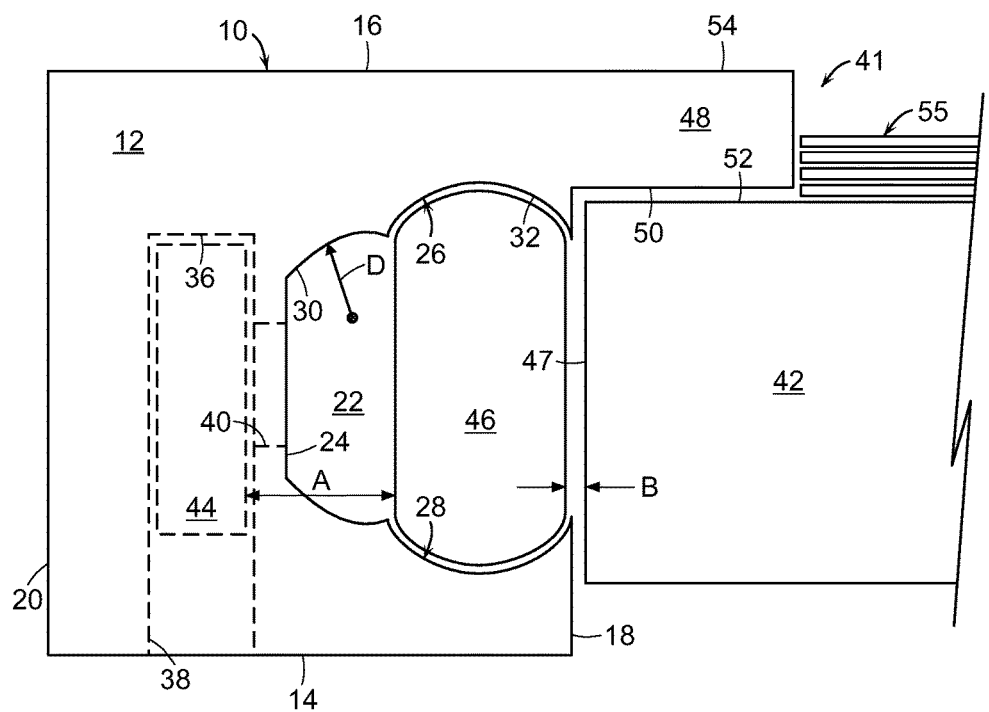
FIG. 7 is an elevation view of a further alternative embodiment of the light mixing chamber of FIG. 1, shown in use with an LED, an optical member, a light guide plate in a backlight.

In certain embodiments, as illustrated in FIGS. 6 and 7, first wall 26 and second wall 28 may be formed with only first portion 30 and second portion 32. In such an embodiment, the distance B between light guide plate 42 and optical member 46 may be reduced. In certain embodiments, light guide plate 42 may directly abut and be in contact with optical member 46.

In certain embodiments, as illustrated in FIG. 7, first wall portions 30 may be curved as they taper outwardly. In certain embodiments, first wall portions 30 are curved with a radius D that can be between approximately 0.2 mm and approximately 0.5 mm.

In certain embodiments, backlight 41 may include a stack of optical films 55 positioned on top of projection surface 52 of light guide plate.

Figure 8:
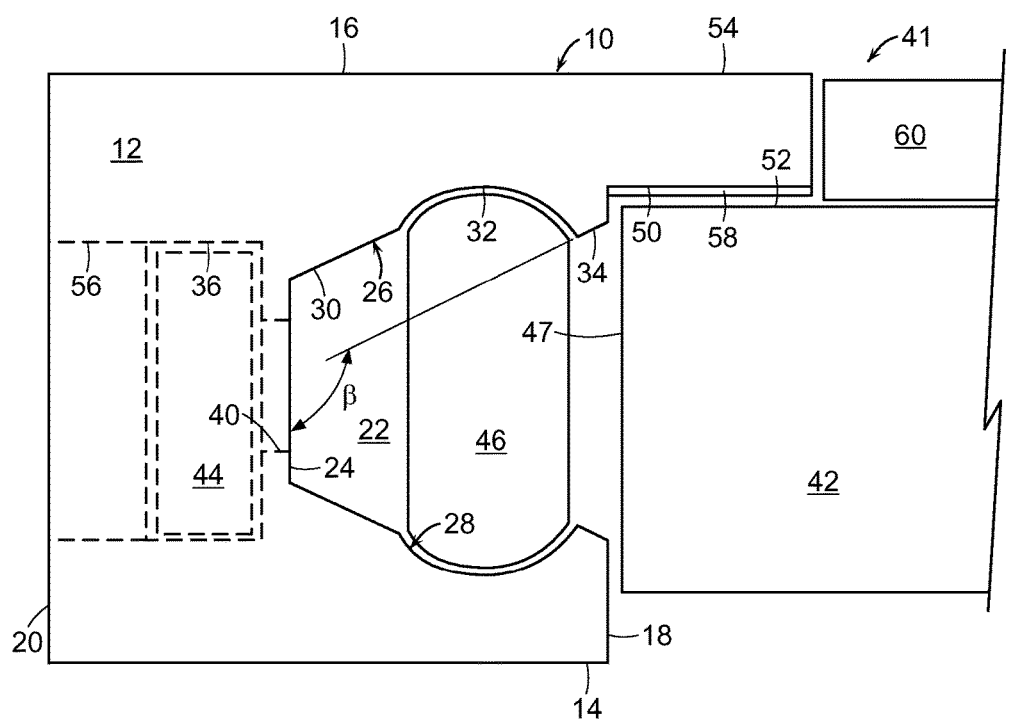
FIG. 8 is an elevation view of yet another alternative embodiment of the light mixing chamber of FIG. 1, shown in use with an LED, an optical member, a light guide plate in a backlight.

In other embodiments, as seen in FIG. 8, chamber 36 may be connected to an exterior of housing 12 with a recess 56 formed in fourth surface 20. It is to be appreciated that recess 56 may extend as far as first surface 14 such that chamber 36 is exposed to an exterior of housing 12 through both first surface 14 and fourth surface 20. In other embodiments, recess 56 may extend as far as second surface 16 such that chamber 36 is exposed to an exterior of housing 12 through both second surface 16 and fourth surface 20.

In yet other embodiments, as seen in FIG. 8, third portions 34 of first wall 26 and second wall 28 may be tapered outwardly at an angle β which is greater than approximately 90° and less than approximately 180° with respect to base portion 24.

In certain embodiments, as illustrated in FIG. 8, a strip of material 58 may be positioned on inner surface 50 of flange 48. Material 58 serves to further reduce hotspots along projection surface 52 of light guide plate 42. Material 58 may be an opaque material, and may be in tape form. Suitable materials for strip of material 58 include micro cell polyethylene terephthalate (MCPET), polyimide and polyester. Other suitable materials will become readily apparent to those skilled in the art, given the benefit of this disclosure.

In other embodiments, an LCD panel 60 may be positioned on top or projection surface 52 of light guide plate 42 to form an LCD display.

Thus, while there have been shown, described, and pointed out fundamental novel features of various embodiments, it will be understood that various omissions, substitutions, and changes in the form and details of the light mixing chamber illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:
1. A light mixing chamber comprising:
a housing having a channel formed therein, the channel exposed to an exterior of the housing;
a chamber formed in the housing; and
an aperture formed in the housing and connecting the chamber to the channel, wherein the channel includes a base portion, a first wall and a second opposed wall, each wall including a first portion, and a second portion, wherein the first portion of each wall is tapered outwardly with respect to the base portion, wherein the second portion of each wall is a curved groove formed in the housing, and wherein a light guide plate of a backlight is adjacent to the light mixing chamber.

2. The light mixing chamber of claim 1, wherein the housing includes a first surface, a second surface opposed to the first surface, and a third surface extending between the first and second surfaces, and further comprising:

a flange extending outwardly from the third surface, proximate the second surface.

3. The light mixing chamber of claim 2, further comprising a strip of material extending along an inner surface of the flange that faces the channel.

4. The light mixing chamber of claim 3, wherein the material is opaque.

5. The light mixing chamber of claim 1, wherein the housing includes a first surface, a second surface opposed to the first surface, a third surface extending between the first and second surfaces, and a fourth surface opposed to the third surface and extending between the first and second surfaces; and further comprising:

a recess formed in one of the first surface and the second surface, the recess connecting the chamber to the exterior of the housing.

6. The light mixing chamber according to claim 5, wherein the recess is formed in the first surface, and the recess and the chamber are racetrack-shaped in cross-section.

7. The light mixing chamber according to claim 5, wherein the recess is formed in the first surface, and the recess and the chamber are circular in cross-section.

8. The light mixing chamber of claim 1, wherein the first portion of each wall is tapered outwardly at an angle up to approximately 135° with respect to the base portion.

9. The light mixing chamber of claim 1, wherein each wall further includes a third portion.

10. The light mixing chamber of claim 9, wherein the third portion of each wall extends substantially perpendicular to the base portion.

11. The light mixing chamber of claim 9, wherein the third portion of each wall is tapered outwardly from the second portion to an exterior of the housing.

12. The light mixing chamber of claim 11, wherein the first portion of each wall is tapered outwardly at an angle up to approximately 135° with respect to the base portion.

13. The light mixing chamber of claim 1, wherein the housing is capable of withstanding temperatures greater than or equal to approximately 100° C. without any significant degradation of reflectivity across all visible wavelengths or mechanical and structural integrity.

14. The light mixing chamber of claim 1, wherein the housing has a reflectance of between approximately 82% and approximately 99% across all visible wavelengths.

15. The light mixing chamber of claim 1, wherein the light mixing chamber is for use adjacent a side edge of the light guide plate, the housing has an elongated dimension and the channel extends along the elongated dimension, and the light mixing chamber comprises a plurality of chambers and a plurality of apertures formed in the housing, each aperture connecting one of the chambers to the channel, the plurality of apertures being arranged in a line along the elongated dimension of the housing.

* * * * *